United States Patent
Hansen, Sr. et al.

(10) Patent No.: US 8,906,181 B2
(45) Date of Patent: Dec. 9, 2014

(54) FAN BLADE FINISHING

(75) Inventors: James O. Hansen, Sr., Glastonbury, CT (US); Jesse Meyer, Colchester, CT (US); Christopher J. Hertel, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 153 days.

(21) Appl. No.: 13/173,738

(22) Filed: Jun. 30, 2011

(65) Prior Publication Data

US 2013/0000827 A1 Jan. 3, 2013

(51) Int. Cl.
| | |
|---|---|
| B44C 3/08 | (2006.01) |
| B44C 5/04 | (2006.01) |
| B29C 65/00 | (2006.01) |
| B31B 1/60 | (2006.01) |
| B32B 37/00 | (2006.01) |
| B63H 1/26 | (2006.01) |
| B63H 7/02 | (2006.01) |
| B64C 11/16 | (2006.01) |
| B64C 27/46 | (2006.01) |
| F01D 5/14 | (2006.01) |
| F03B 7/00 | (2006.01) |
| F03D 11/02 | (2006.01) |
| F04D 29/38 | (2006.01) |
| B64C 11/24 | (2006.01) |
| F01D 5/18 | (2006.01) |
| F03B 3/12 | (2006.01) |
| B32B 5/12 | (2006.01) |
| B32B 1/00 | (2006.01) |
| B32B 3/00 | (2006.01) |
| B32B 9/00 | (2006.01) |
| B32B 15/04 | (2006.01) |
| B32B 5/18 | (2006.01) |
| B23P 9/04 | (2006.01) |
| F01D 5/28 | (2006.01) |
| F04D 29/02 | (2006.01) |
| F04D 29/32 | (2006.01) |

(52) U.S. Cl.
CPC . F01D 5/147 (2013.01); B23P 9/04 (2013.01); F01D 5/286 (2013.01); F01D 5/288 (2013.01); F04D 29/023 (2013.01); F04D 29/324 (2013.01); F05D 2300/702 (2013.01); Y02T 50/672 (2013.01)
USPC ............. 156/220; 156/219; 156/196; 156/60; 416/224; 416/230; 416/233; 416/229 A; 428/113; 428/174; 428/613; 428/469

(58) Field of Classification Search
USPC ............ 156/60, 196, 219, 220; 416/224, 229, 416/230, 233; 428/113, 174, 469, 613
See application file for complete search history.

(56) References Cited

U.S. PATENT DOCUMENTS

| | | | | |
|---|---|---|---|---|
| 3,694,104 A | * | 9/1972 | Erwin | 416/217 |
| 3,890,456 A | * | 6/1975 | Dils | 428/216 |

(Continued)

OTHER PUBLICATIONS

Article entitled "NonMetals Test and Evaluation for AFRL-ML-WP-TR-2006-4009", Delivery Order 0001: Alternate Positve Pressure Cure Cycles for 250 Degrees F-Curing Epoxy, by Breatt A. Bolan, Jan. 2006, pp. 1-42.

(Continued)

*Primary Examiner* — Richard Crispino
*Assistant Examiner* — Matthew Hoover
(74) *Attorney, Agent, or Firm* — Kinney & Lange, P.A.

(57) ABSTRACT

A method of finishing a fan blade includes bonding a sheath and a cover to an aluminum fan blade with an airfoil, a root, a leading edge and a tip; imparting residual stresses onto the blade; coating the blade to protect exposed areas of the blade; and curing the blade in low-temperature cure cycles to preserve residual stresses imparted.

19 Claims, 4 Drawing Sheets

(56) References Cited

U.S. PATENT DOCUMENTS

| | | | |
|---|---|---|---|
| 4,051,289 A * | 9/1977 | Adamson | 428/113 |
| 4,309,848 A | 1/1982 | Arrigoni | |
| 4,426,867 A | 1/1984 | Neal et al. | |
| 4,594,761 A * | 6/1986 | Murphy et al. | 29/889.71 |
| 5,645,893 A | 7/1997 | Rickerby et al. | |
| 6,544,002 B1 * | 4/2003 | Evans et al. | 416/224 |
| 6,652,982 B2 | 11/2003 | Spitsberg et al. | |
| 6,667,114 B2 | 12/2003 | Grylls et al. | |
| 7,326,435 B2 * | 2/2008 | Buckingham et al. | 427/64 |
| 7,429,174 B2 | 9/2008 | Burns et al. | |
| 2004/0180232 A1 | 9/2004 | Das et al. | |
| 2004/0258529 A1 * | 12/2004 | Crain et al. | 416/219 R |
| 2005/0271881 A1 * | 12/2005 | Hong | 428/423.1 |
| 2006/0182892 A9 | 8/2006 | Spitsberg et al. | |
| 2010/0028711 A1 | 2/2010 | Helmick et al. | |

OTHER PUBLICATIONS

U.S. Appl. No. 12/713,867, filed Feb. 26, 2010.

* cited by examiner

FAN BLADE FINISHING

BACKGROUND

Titanium alloys and fiber composites are the benchmark classes of materials for fan and compressor blades in commercial airline engines. One reason for the materials being so broadly adopted is that regulations require an engine in commercial service to be capable of ingesting birds while allowing for continued operation or safe and orderly shutdown of that engine. Another reason is that blades must resist cracking from nicks and dents caused by small debris such as sand and rain. Engines with titanium fan blades as well as certain reinforced fiber composite fan blades with adhesively bonded metallic leading edge sheaths are the most common blades used to meet these criteria.

While titanium blades are relatively strong, they are heavy and expensive to manufacture. Composite blades offer sufficient strength and a significant weight savings over titanium, but they are expensive to process. Further, due to their relatively low strain tolerance, composite blades require a greater thickness than otherwise equivalent metal blades to meet bird strike requirements. Greater blade thickness reduces fan efficiency and offsets a significant portion of weight savings from using composite materials.

Blades made of aluminum or aluminum alloy can result in significant weight savings. However, aluminum alloy blades are less erosion resistant and lower in strength than past titanium or composite blades. A leading edge sheath made of titanium or nickel can give the aluminum blade added protection without significantly increasing the weight.

SUMMARY

A method of finishing a fan blade includes bonding a sheath and a cover to an aluminum fan blade with an airfoil, a root, a leading edge and a tip; imparting residual stresses onto the blade; coating the blade to protect exposed areas of the blade; and curing the blade in low-temperature cure cycles to preserve residual stresses imparted.

DETAILED DESCRIPTION

Figure 1:
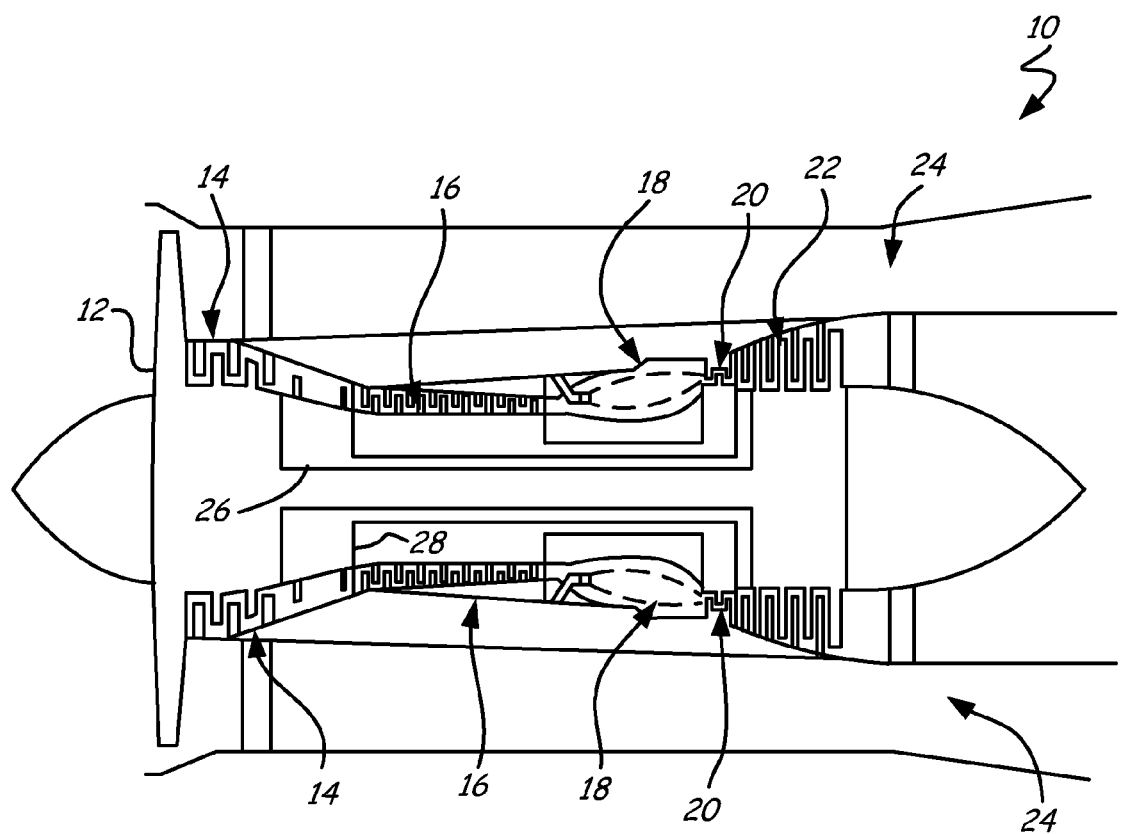
FIG. 1 schematically depicts a cross-section of a turbofan engine.

FIG. 1 shows an example of a dual-spool turbofan engine. Turbofan engine 10 comprises several sections: fan section 12, first low-pressure compressor section 14, second high-pressure compressor section 16, combustor section 18, first high-pressure turbine section 20, second low-pressure turbine section 22, bypass section 24, low-pressure shaft 26, and high-pressure shaft 28. A portion of the atmospheric air pulled in by rotation of fan section 12 is directed toward first compressor section 14, while the remainder is directed toward bypass section 24.

Air directed through first compressor section 14 is further compressed by second compressor section 16. Fuel is added and ignited in combustor section 18. Blades in turbine sections 20 and 22 capture a portion of the energy from passing combustion products by turning turbine rotors. Both fan section 12 and first compressor section 14 are rotatably linked via low-pressure shaft 26 to first low-pressure power turbine section 22. Second high-pressure compressor section 16 is rotatably connected to first high-pressure turbine section 20 via high-pressure shaft 28. Thrust is generated in engine 10 by the force of the air drawn in by fan section 12 and pushed through bypass section 24 (less any bleed air used for other aircraft functions), and by the force of exhaust gases exiting from second low-pressure turbine section 22.

Being designed to pull vast quantities of air through bypass section 24 to generate thrust, blades in fan section 12 are the first line of defense for engine 10 and are highly susceptible to both small and large scale damage from the operating temperature and conditions of engines as well as objects pulled in with the surrounding air. Small scale blade damage through pitting, erosion, corrosion or cracking causes performance deterioration and increases the number of potential crack initiation sites, while large scale damage includes blade deformation and failure. Small impacts can lead to large scale damage by serving as crack initiation sites. Larger impacts, such as ingestion of birds can cause one or more blades to deform or break in a single event. Regulations are in place to limit the frequency and severity of single event failures because of the increased risk of emergency landings and catastrophic failure.

Aluminum blades with a leading edge sheath can be used as a lower-cost and lighter-weight alternative to titanium and composite blades. Because aluminum blades have low fatigue strength in comparison to titanium, peening is often used to improve fatigue capability. Peening imposes residual stresses on surfaces peened. These stresses help to resist corrosion and crack formation or propagation. For example, conventional shot peening can result in a 20% improvement in high cycle fatigue strength.

However, the positive effects of peening can be greatly reduced by exposure to high temperatures. Aluminum fan blades require coatings due to the susceptibility of aluminum to corrosion and erosion. Conventional methods of curing adhesives and coatings on blades require temperatures at or above about 250 degrees Fahrenheit ("F") (about 394 Kelvin "K"). The high temperatures used to cure coatings and adhesives can relieve the peening stresses, greatly reducing the benefits of peening. For example, at about 250 degrees F. (about 394 K) (about 394 K), about 60% of the peening residual stress imparted by conventional shot peening is relieved, corresponding with a reduction in fatigue strength. A decrease in curing temperatures from about 250 degrees F. (about 394 K) to about 180 degrees F. (about 355 K) has shown an increase of about 10% in high cycle fatigue strength. A decrease in curing temperatures from about 550 degrees F. (about 561 K) to about 250 degrees F. (about 394 K) in pitted blades has shown to result in an increase of about double the low cycle fatigue life.

The current invention is a method of finishing an aluminum blade which imparts residual stresses to improve fatigue strength and preserves the strength through the use of selected coatings, primers and adhesives; and modifying finishing sequences and cure cycles for the blade.

The following figures show a fan blade made of aluminum and a sheath made of a high-strength material such as titanium or nickel, and describe methods of finishing the blade. Blade 30 can be adapted for use in a dual-spool engine 10 shown in FIG. 1. In addition, the example blades described below can also be readily adapted for engines having any number of spools, such as engines with single spool or three-spool construction.

Figure 2:
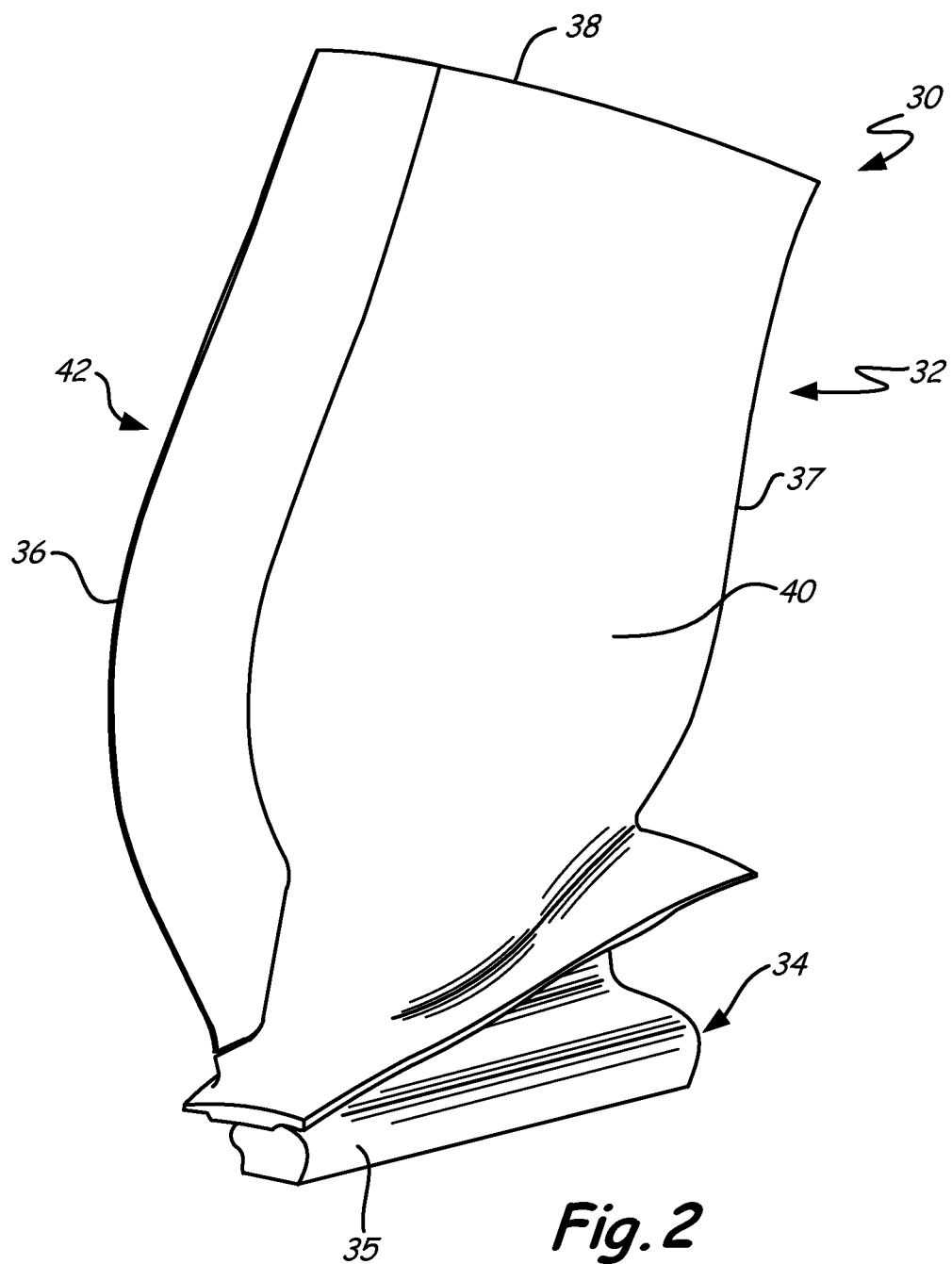
FIG. 2 shows a view of a blade and sheath that has been finished according to methods of the current invention.

FIG. 2 shows a view of a blade and sheath that has been finished according to methods of the current invention. Blade 30 includes airfoil 32, root 34, wear pads 35, leading edge 36, trailing edge 37, tip 38, suction surface 40 and sheath 42. The pressure surface (which is on the opposite side of airfoil 32 from suction surface 40) is not visible in this depiction. Root 34 fits into a disc (not shown) to rotate blade 30 within fan section 12. Sheath 36 can be a titanium alloy or other material with sufficient strength to protect blade 30 in engine 10 when engine 10 is in operation. Blade 30 with airfoil 32 and root 34 can be an aluminum alloy or a similar lightweight material to provide a lightweight blade without a complicated and expensive manufacturing process.

Figure 3:
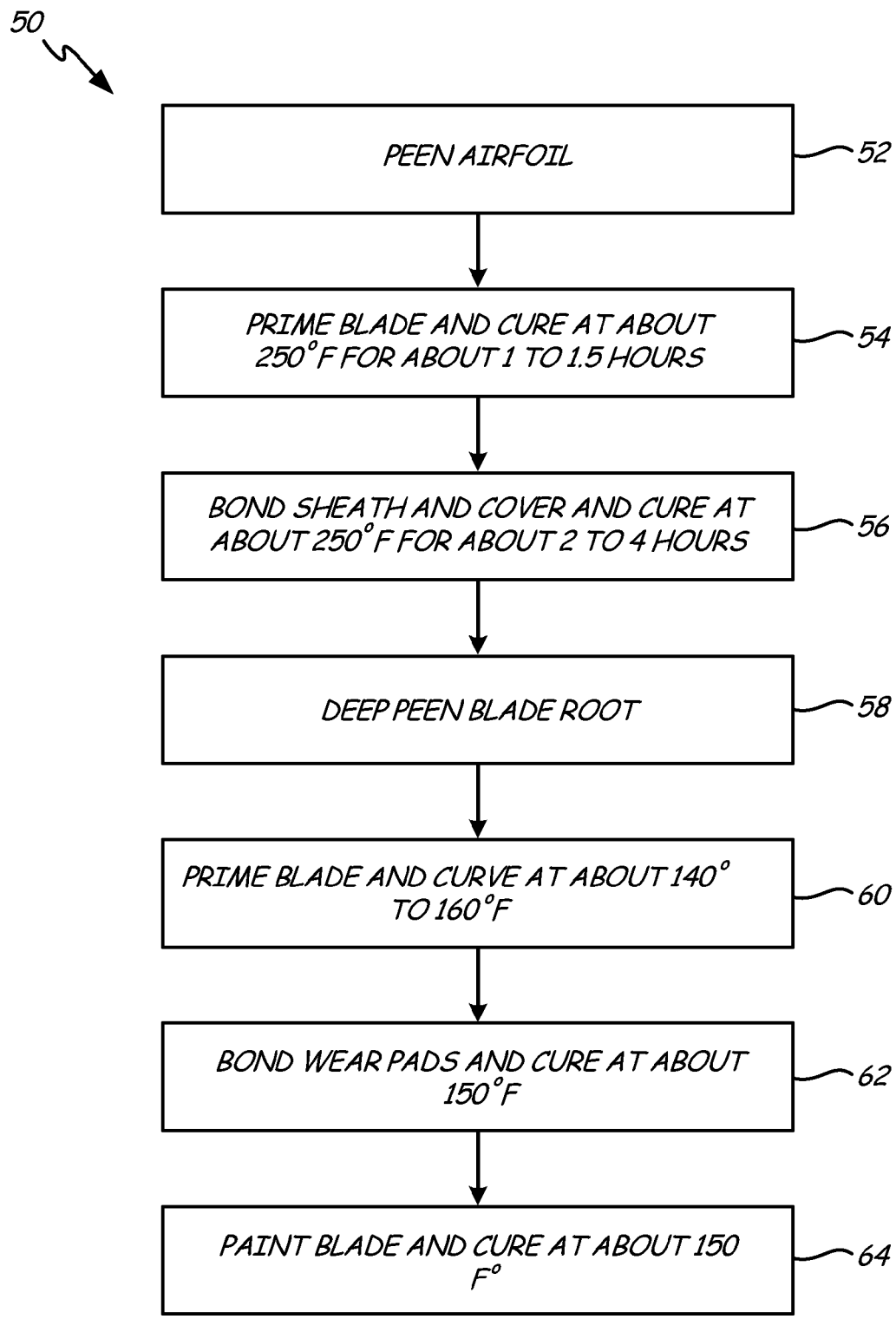
FIG. 3 shows a block diagram of a method for finishing a fan blade according to the current invention.

FIG. 3 shows a block diagram of a method for finishing fan blade 30 which has already been fabricated through casting, machining or any other method known in the art. Method 50 includes the steps of peening airfoil and internal cavities (step 52), priming the blade and curing at about 250 degrees F. (about 394 K) for about 1 to about 1.5 hours (step 54), bonding the sheath and cover to the blade and curing at about 250 degrees F. (about 394 K) for about 2 to about 4 hours (step 56), deep peening the blade root (step 58), priming the blade and curing at about 140 (about 333 K) to about 160 degrees F. (about 344 K) (step 60), bonding wear pads and curing at about 150 degrees F. (about 339 K) (step 62) and painting the blade and curing at about 150 degrees F. (about 339 K) (step 64).

Peening the airfoil and internal cavities (step 52) imposes residual stresses at the surfaces peened. Peening can be done by shot peening, laser shock, ultrasonic, low plasticity burnishing or any other method generally known in the art. The imposing of surface stresses through peening results in resistance to fatigue and corrosion by resisting crack formation and pitting at these surfaces. This compressive strength from peening can keep cracks from propagating even if some pitting or corrosion on blade 30 does occur.

Priming the blade and curing at about 250 degrees F. (about 394 K) for about 1 to 1.5 hours (step 54) is done is to prepare blade 30 for bonding to sheath 46 and cover. A primer is applied to all surfaces of blade 30. Examples of suitable bond primers are type EC3924B available from 3M and Chemlok® 218 from LORD Corporation.

Bonding sheath and cover to the blade and curing at about 250 degrees F. (about 394 K) for about 2 to about 4 hours (step 56) comes next. Sheath 42 helps to protect leading edge of blade 30 from impact damage. Thus, it is essential that it is bonded securely onto blade 30. Adhesive can be one of a variety of commercially available aerospace-quality metal-bonding adhesives, including several epoxy- and polyurethane-based adhesive films. An example of a suitable bonding agent is type EA9628 epoxy adhesive available from Henkel Corporation, Hysol Division, Bay Point, Calif. and type AF163K epoxy adhesive available from 3M Adhesives, Coatings & Sealers Division, St. Paul, Minn. In certain embodiments, adhesive is a film. A scrim sheet can be embedded into adhesive to provide dielectric separation between airfoil 32 and sheath 42, preventing galvanic corrosion between the two different metal surfaces of airfoil and sheath.

Deep peening root 34 (step 58) can be done using gas propelled steel balls to impinge root 34. The balls can have a diameter of about 0.06 inches (1.524 mm) to about 0.09 inches (2.286 mm) to bring a peening intensity of about 6 C to about 10 C on the Almen scale. This can result in a compressive stress field reaching about 0.030 inches (0.762 mm) to about 0.040 inches (1.016 mm) below the surfaces of root 34. The process of peening can be done using an automated cabinet system where an air pressure hose gun assembly propels the steel balls into the surface of root 44. Deep peening can significantly enhance durability and damage tolerance of aluminum alloy blade root 34 by introducing compressive residual stress fields of sufficient magnitude and depth to retard or prevent development and growth of corrosion damage or fatigue crack development and propagation. Due to the thickness of root 34 in comparison to airfoil 32, root 34 is able to be subject to deep peening to protect root 34 against deeper pitting or corrosion than the peening in step 52. The deep peening process; size, weight and material of balls used; peening intensity and compressive stress field can be varied according to blade 30 material properties and requirements.

Priming the blade and curing at about 140 degrees F. (about 333 K) to about 160 degrees F. (about 344 K) (step 60) prepares the blade for step 62. Examples of suitable primers are 44GN036 or 44GN054 by Deft Corporation of Irvine, Calif.

Bonding wear pads 35 and curing at about 150 degrees F. (step 62) is done to protect blade 30 root 34. Pads can be bonded with an epoxy adhesive that can include a scrim sheet, and can be bonded to the sides of root 34 as well as extending up blade 30 neck. Wear pads 35 act to galvanically isolate blade 30 root 34 from the hub, which is generally made of titanium. This galvanic isolation helps to protect aluminum blade 30 root 34 from corrosion, as well as protect blade 30 neck during installation. Additionally, wear pads 35 can eliminate fretting or galling that can occur at root 34.

Painting the blade and curing at about 150 degrees F. (about 339 K) (step 64) is done to protect blade 30 against erosion and corrosion. Example of suitable coatings for step 64 include HC05XP1 by Hontek Corporation of South Windsor, Conn.; JL-77-294-2 by Jonel Laboratories of Meriden, Conn.; Chemglaze® M331 by LORD Corporation of Erie, Pa.; Laminar X-500 from Akzo Nobel Aerospace, Waukegan, Ill. and AeroKret of Analytic Services & Materials, Inc. of Hampton, Va.

Steps 52 and 58 impart residual stresses to blade surfaces to improve fatigue strength in blade. Steps 54 and 56 improve blade performance by securely bonding a high strength sheath to protect airfoil leading edge from damage. Steps 60-64 add blade protection through wear pads on blade 30 root 34 and through coatings to protect against corrosion and erosion, while maintaining much of the residual stress imparted in steps 52 and 58 by curing at lower temperatures and for longer times than conventional recommended curing methods.

The current invention provides a method of finishing a high strength aluminum blade with a sheath through: imparting high fatigue strength through peening; and maintaining that strength through selection of particular primers, coatings and adhesives and modification of finishing sequence and cure cycles. The selection of primers, coatings and adhesives that can be cured at low temperatures without a meaningful reduction in strength (when compared to higher temperature cures) allows for the benefits of the peening (and deep peening) to be maintained. These benefits include increasing the high cycle fatigue endurance limit, increasing low cycle fatigue capability, and increasing tolerance to corrosion and crack formation from pitting.

Figure 4:
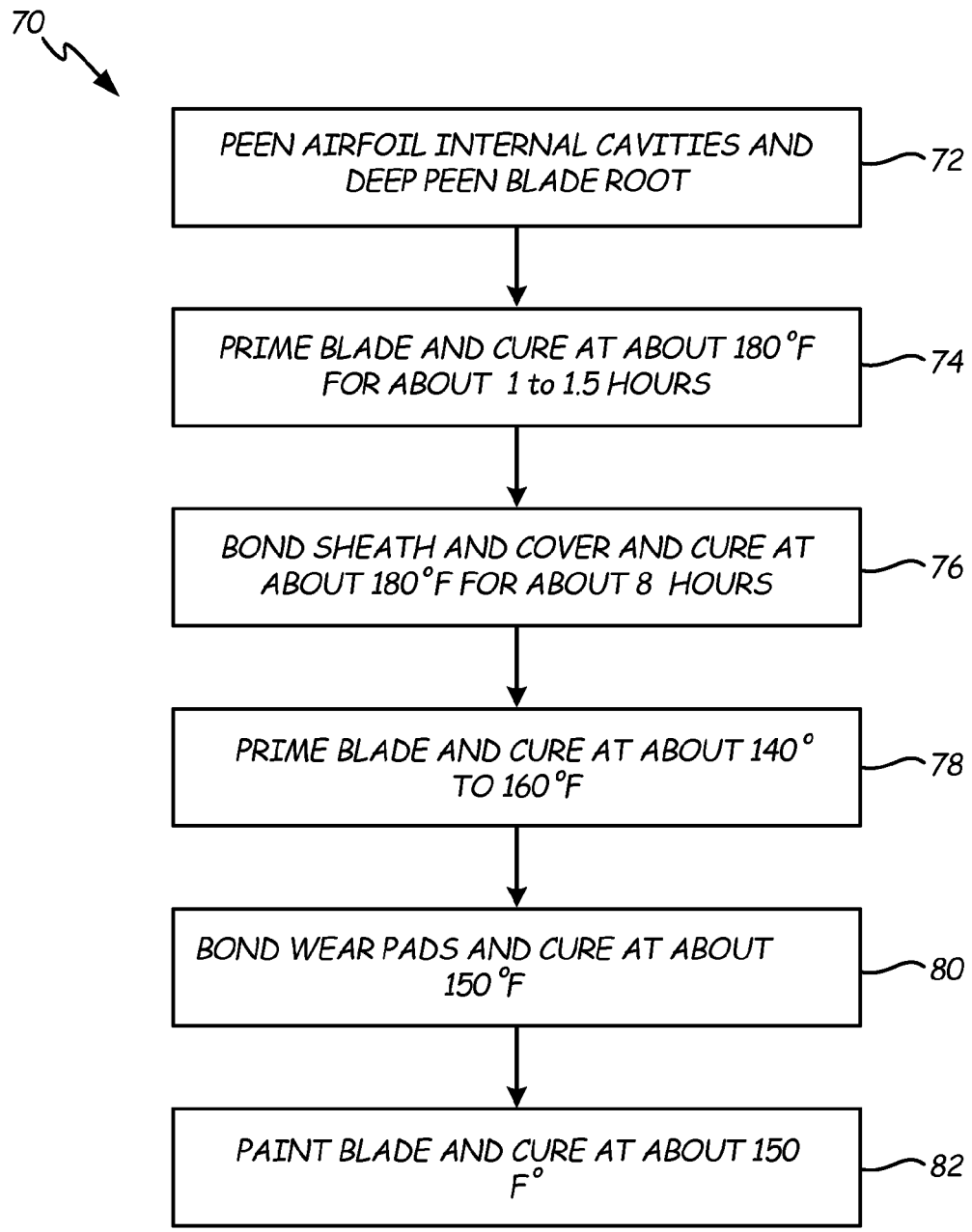
FIG. 4 shows a block diagram of a second method for finishing fan blade according to the current invention.

FIG. 4 shows a block diagram of a second method for finishing fan blade 30. Method 70 includes the steps of peening airfoil and internal cavities and deep peening root (step 72), priming the blade and curing at about 180 degrees F.

(about 355 K) for about 2 hours (step 74), bonding the sheath and cover to the blade and curing at about 180 degrees F. (about 355 K) for about 8 hours (step 76), priming the blade and curing at about 140 degrees F. (about 333 K) to about 160 degrees F. (about 344 K) (step 78), bonding wear pads and curing at about 150 degrees F. (about 339 K) (step 80) and painting the blade and curing at about 150 degrees F. (about 339 K) (step 82).

Method 70 differs from method 60 in both the sequence of finishing steps and cure cycles related to steps 74 and 76. Peening is done to both airfoil and root in initial step 72. Because of this, cure cycles following the peening are adjusted to be lower in temperature and extended in length. The lower temperatures of the cure cycles ensure that the benefits of the peening processes on the blade are preserved throughout the blade bonding and coating processes. The cure cycle times are extended to achieve similar strengths to curing at higher temperatures for shorter amounts of time.

While FIG. 4 shows the airfoil peening and deep peening of blade 30 root 34 done at the same step, deep peening of root 34 could be done after step 76 as shown in method 60 of FIG. 3. Curing cycles in steps 74 and 76 could stay at lower temperatures for longer times to preserve peening benefits on the airfoil.

In summary, the method of finishing a high strength aluminum blade with a sheath allows the use of an aluminum blade by imparting fatigue strength through peening and preserving the strength imparted by selecting specific coatings and adhesives and modifying finishing steps and cure cycle temperatures and times. Using primers, coatings and adhesives that can be cured at low temperatures for longer amounts of time without a meaningful reduction in strength (when compared to higher temperature cures) allows for the benefits of the peening (and deep peening) to be maintained on the blade. This results in a blade with increased high cycle fatigue endurance limit, increased low cycle fatigue capability, and increased tolerance to corrosion and crack formation from pitting.

The above examples of the adhesives, coatings and primers used in the finishing of blade 30 are included for example purposes only and can readily modified by one skilled in the art. The curing temperatures and times can vary depending on the adhesives, coatings and materials used. The sequence of finishing steps can also change depending on the requirements of the blade and manufacturing facility. While the blade has been discussed in relation to being made of aluminum, this can include aluminum alloys. Similarly, the discussion involving the use of titanium or nickel in sheaths includes the use of titanium or nickel alloys.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of finishing an aluminum fan blade with an airfoil, a blade root, a leading edge and a tip, the method comprising:
   bonding a sheath and a cover to the aluminum fan blade;
   imparting residual stresses onto the aluminum fan blade by peening;
   coating the aluminum fan blade with a first primer to protect exposed areas of the aluminum fan blade;
   bonding wear pads to the blade root with a first adhesive;
   painting the aluminum fan blade with a coating; and
   curing the first primer, the coating, and the first adhesive in low-temperature cure cycles below 250 degrees F. (394 degrees K) to preserve residual stresses imparted.

2. The method of claim 1, wherein the step of imparting residual stresses on the aluminum fan blade comprises:
   peening the airfoil of the aluminum fan blade.

3. The method of claim 1, wherein the step of imparting residual stresses on the aluminum fan blade comprises:
   peening the blade root.

4. The method of claim 3, wherein the peening on the blade root comprises deep peening.

5. The method of claim 4, wherein after the step of imparting residual stresses onto the aluminum fan blade, cure temperatures in the low-temperature cure cycles are at or below about 160 degrees F.

6. The method of claim 1, wherein the steps of coating the aluminum fan blade with a first primer to protect exposed areas of the aluminum fan blade, bonding the wear pads to the blade root with a first adhesive, and painting the aluminum fan blade with a coating further comprise:
   priming the aluminum fan blade with the first primer and curing the first primer at about 140 degrees F. (about 333 K) to about 160 degrees F. (about 344 K);
   bonding the wear pads with the first adhesive and curing the first adhesive at about 150 degrees F. (about 339 K); and
   painting the aluminum fan blade with the coating and curing the coating at about 150 degrees F. (about 339 K).

7. The method of claim 1, wherein the step of bonding a sheath and a cover to the aluminum fan blade further comprises:
   priming the aluminum fan blade with a bond primer and curing the bond primer at about 250 degrees F. (about 394 K) for about 1 to about 1.5 hours; and
   bonding the sheath and cover to the aluminum fan blade with a second adhesive and curing the second adhesive at about 250 degrees F. (about 394 K) for about 2 to about 4 hours.

8. The method of claim 1, wherein the step of bonding a sheath and a cover to the aluminum fan blade further comprises:
   priming the aluminum fan blade with a bond primer and curing the bond primer at about 180 degrees F. (about 355 K) for about 2 hours; and
   bonding the sheath and cover to the aluminum fan blade with a second adhesive and curing the second adhesive at about 180 degrees F. (about 355 K) for about 8 hours.

9. A method of finishing an aluminum fan blade with an airfoil and a blade root, the method comprising:
   peening the aluminum fan blade to impart residual stresses;
   priming the aluminum fan blade with a first primer and curing the first primer;
   bonding a sheath and cover to the aluminum fan blade with a first adhesive and curing the first adhesive;
   priming the aluminum fan blade with sheath and cover with a second primer and curing the second primer;
   bonding wear pads to the blade root with a second adhesive and curing the second adhesive; and
   painting the aluminum fan blade with a coating and curing the coating, wherein all curing is done at temperatures below about 250 degrees F. (about 394 K).

10. The method of claim 9, wherein the step of peening the aluminum fan blade comprises:
   peening the airfoil of the aluminum fan blade; and
   deep peening the blade root.

11. The method of claim 9, wherein all curing is done at temperatures at or below about 180 degrees F. (about 355 K).

12. The method of claim 9, wherein the step of priming the aluminum fan blade and curing comprises:
   priming the aluminum fan blade with the first primer and curing the first primer below about 250 degrees F. (about 394 K) for about 1 to about 1.5 hours.

13. The method of claim 9, wherein the step of bonding a sheath and cover to the aluminum fan blade and curing comprises:
   bonding the sheath and cover to the aluminum fan blade with a first adhesive and curing the first adhesive below about 250 degrees F. (about 394 K) for about 2 to about 4 hours.

14. The method of claim 9, where the step of bonding a sheath and cover to the aluminum fan blade and curing comprise:
   bonding the sheath and cover to the aluminum fan blade with the first adhesive and curing the first adhesive at about 180 degrees F. (about 355 K) for about 8 hours.

15. The method of claim 9, wherein the step of priming the aluminum fan blade with sheath and cover and curing comprises:
   priming the aluminum fan blade with the second primer and curing the second primer at about 140 degrees F. (about 333 K) to about 160 degrees F. (about 344 K).

16. The method of claim 9, wherein the step of bonding wear pads to the blade root and curing comprises:
   bonding wear pads to the blade root with the second adhesive and curing the second adhesive at about 150 degrees F. (about 339 K).

17. The method of claim 9, wherein the step of painting the aluminum fan blade and curing comprises:
   painting the aluminum fan blade with a coating and curing the coating at about 150 degrees F. (about 339 K).

18. A method of finishing an aluminum alloy fan blade to preserve fatigue strength, the method comprising:
   (a) peening an airfoil and cavities of the aluminum alloy fan blade to impart residual stresses;
   (b) priming the aluminum alloy fan blade with a bond primer;
   (c) curing the bond primer;
   (d) bonding a sheath and a cover of the aluminum alloy fan blade with a first adhesive;
   (e) curing the first adhesive;
   (f) deep peening a root of the aluminum alloy fan blade to impart residual stresses;
   (g) priming the aluminum alloy fan blade with a first primer;
   (h) curing the first primer at a first low temperature;
   (i) bonding wear pads to the blade root with a second adhesive;
   (j) curing the second adhesive at a second low temperature;
   (k) painting the aluminum alloy fan blade with a coating; and
   (l) curing the coating at a third low temperature.

19. The method of manufacturing of claim 18, wherein the first, second, and third low temperatures for curing are at or below about 180 degrees F. (about 355 K).

* * * * *